United States Patent
Okumura et al.

(10) Patent No.: US 7,464,749 B2
(45) Date of Patent: Dec. 16, 2008

(54) AIR-CONDITIONING UNIT

(75) Inventors: Yoshihiko Okumura, Kariya (JP); Takahiro Tokunaga, Kosai (JP)

(73) Assignee: Denso Corporation, Kariya (JP)

( * ) Notice: Subject to any disclaimer, the term of this patent is extended or adjusted under 35 U.S.C. 154(b) by 614 days.

(21) Appl. No.: 10/979,950

(22) Filed: Nov. 2, 2004

(65) Prior Publication Data

US 2005/0098311 A1   May 12, 2005

(30) Foreign Application Priority Data

Nov. 6, 2003   (JP)   ............................. 2003-376972

(51) Int. Cl.
*B60H 1/00* (2006.01)
(52) U.S. Cl. .................. 165/204; 165/202; 165/42; 454/160; 454/161
(58) Field of Classification Search .................. 165/41, 165/42, 43, 44, 202, 203, 204; 454/69, 159, 454/160, 161
See application file for complete search history.

(56) References Cited

U.S. PATENT DOCUMENTS

| | | | | |
|---|---|---|---|---|
| 4,852,638 A | * | 8/1989 | Hildebrand et al. | ........... 165/42 |
| 4,972,992 A | * | 11/1990 | Scheidel et al. | ............... 165/42 |
| 6,007,421 A | * | 12/1999 | Schwarz | ..................... 454/160 |
| 6,484,755 B1 | * | 11/2002 | Schwarz | ..................... 165/203 |
| 6,889,761 B2 | * | 5/2005 | Perry et al. | ................. 165/202 |

FOREIGN PATENT DOCUMENTS

| JP | 01-074912 | 5/1989 |
|---|---|---|
| JP | 7-89332 | 4/1995 |
| JP | 10-035250 | 2/1998 |

OTHER PUBLICATIONS

Notice of Reasons for Refusal dated May 27, 2008 in JP Application No. 2003-376972 with English translation.

* cited by examiner

*Primary Examiner*—Ljiljana (Lil) V Ciric
(74) *Attorney, Agent, or Firm*—Harness, Dickey & Pierce, PLC

(57) ABSTRACT

The air-conditioning unit includes an air-conditioning case, a heater, a bypass path bypassing the heater, an air-mixing chamber, an air-mixing door, and an air opening. The air-conditioning unit also includes an auxiliary door arranged in series with the air-mixing door in the bypass path. The auxiliary door is operated between at a first position and at a second position. The auxiliary door in the first position closes the bypass path more than in the second position. The auxiliary door is operated at the first position at least when the air-mixing door opens the bypass path slightly.

23 Claims, 5 Drawing Sheets

AIR-CONDITIONING UNIT

PRIORITY STATEMENT

This U.S. nonprovisional application claims priority on Japanese Patent Application No. 2003-376972 filed on Nov. 6, 2003, the entire disclosure of which is incorporated herein by reference.

FIELD OF THE INVENTION

The present invention generally relates to an air-conditioning unit.

BACKGROUND OF THE INVENTION

Conventional air-conditioning units may include an evaporator producing cool air, a heater producing hot air, a bypass path allowing the cool air to bypass the heater, an air-mixing door adjusting an air-flow ratio between an amount of cool air passing through the heater and an amount of cool air passing through the bypass path, an air-mixing chamber in which the air from the heater and the air from the bypass path are mixed, and at least one air opening from which the mixed air may be discharged. In the conventional air-conditioning units, as the air-mixing door opens the bypass path slightly from a maximum heating position, in which the air-mixing door may fully close the bypass path, a significant amount of cool air may rapidly flow through the narrow bypass path. As a result, the temperature of the mixed air discharged from the air opening may decrease sharply as shown by the chain double-dashed line in FIG. 5, which illustrates a temperature characteristic of mixed air with respect to a position of the air-mixing device for a conventional air-conditioning unit (chain double-dashed line), an embodiment of the present invention (solid line), and an ideal case (dashed line).

SUMMARY OF THE INVENTION

Example embodiments of the air-conditioning unit according to the present invention may improve temperature characterisitics of air discharged from an air opening of the air-conditioning unit.

In an example embodiment, the present invention is directed to an air-conditioning unit comprising an air-conditioning case, a heater, a bypass path bypassing the heater, an air-mixing chamber, an air-mixing door, and an air opening. The air-conditioning unit further comprises an auxiliary door arranged in series with the air-mixing door in the bypass path. The auxiliary door is operated between a first position and a second position. The auxiliary door in the first position closes the bypass path more than in the second position. The auxiliary door is operated at the first position at least when the air-mixing door opens the bypass path slightly.

In another exemplary embodiment, an air-mixing control device controls an amount of air bypassing a heater in the air conditioning unit, and an air-resistance device selectively provides resistance to the controlled amount of air bypassing the heater.

BRIEF DESCRIPTION OF THE DRAWINGS

The present invention will be more readily apparent from the following detailed description of example embodiments when taken together with the accompanying drawings, in which.

DETAILED DESCRIPTION OF EXAMPLE EMBODIMENTS

Example embodiments of the present invention will be described hereinafter with reference to the accompanying drawings.

Figure 1:
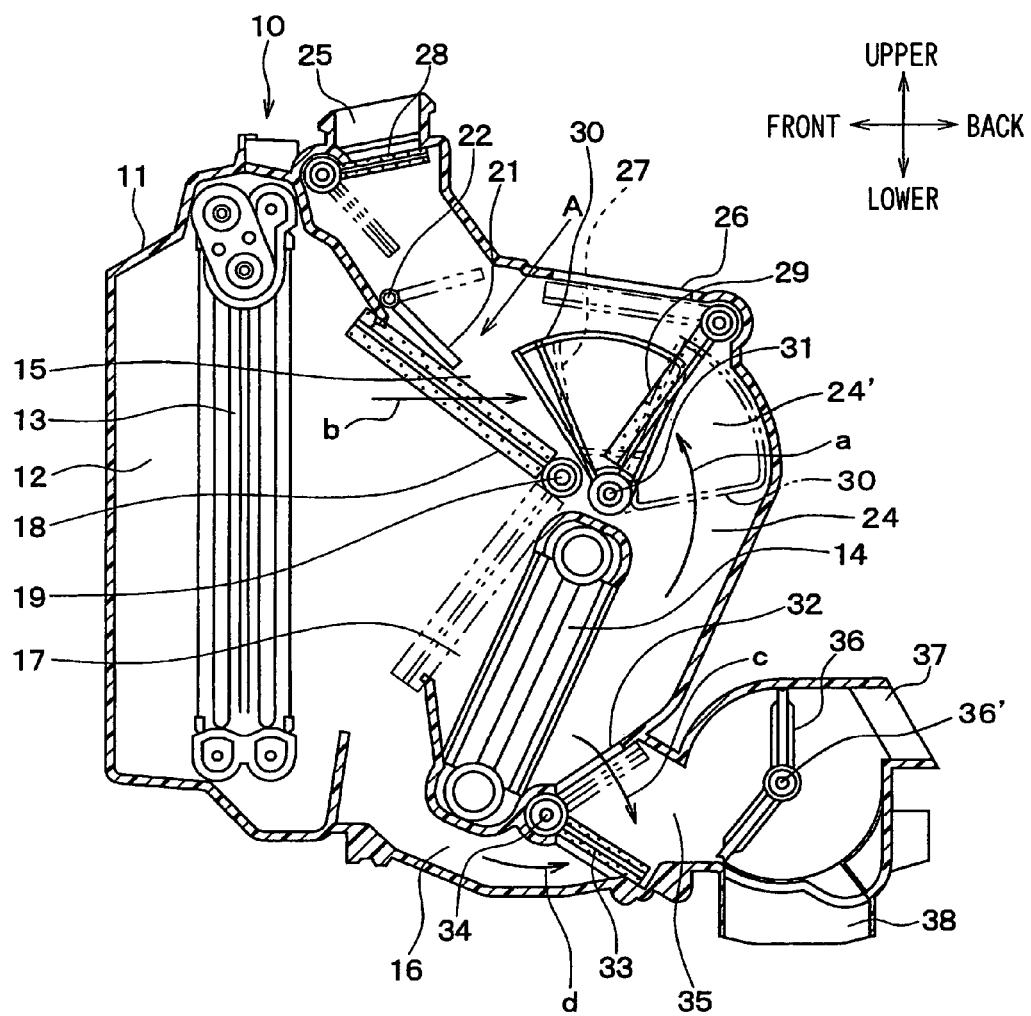
FIG. 1 illustrates a cross section of an air-conditioning unit according to an example embodiment of the present invention.

A ventilation system of an air-conditioner for a vehicle may include an air conditioning unit 10 shown in FIG. 1 and a blower unit (not shown) for blowing air into the air-conditioning unit 10.

The air-conditioning unit 10 may be disposed substantially at a center portion along a width direction (right and left direction) of a vehicle and inside an instrument panel in a passenger compartment of the vehicle. Further, the air-conditioning unit 10 may be mounted on a vehicle as indicated by the directional arrows upper, lower, front and back, which respectively represent the direction of the upper portion of the vehicle, the lower portion of the vehicle, a front of the vehicle, and a back of the vehicle. While not shown in FIG. 1, into the page of FIG. 1 represents a right side of the vehicle and out of the page of FIG. 1 represents a left side of the vehicle.

The blower unit (not shown) may be also disposed inside the instrument panel, but may be shifted from the air-conditioning unit 10 to a front passenger's seat side in the vehicle's width direction. In this example embodiment, the blower unit may be shifted to a side from the air-conditioning unit 10.

The blower unit may include an inside/outside air-switching unit and a fan unit as well-known. In this example embodiment, the fan unit may include a centrifugal fan sucking air from an axial direction thereof and discharging air in a radial direction thereof. The fan may be rotated by an electric motor.

The air conditioning unit 10 may include an air-conditioning case 11. The air-conditioning case 11 may form an air path therein and may be made of a resin. Also, the air-conditioning case 11 may be divided into left side casing portion and right side casing portion by a vertical plane at a central portion thereof. The two casing portions may be integrally connected by using a fastening member such as a metal spring clip and/or a screw and/or the like.

An air inlet 12 may be provided in the air-conditioning case 11 at the front most side thereof. Air, blown from the blower unit, may flow into the air-conditioning case 11 through the air inlet 12, and may flow backward in the air-conditioning case 11.

An evaporator 13 may be disposed in the air-conditioning case 11, and a heater 14 may be disposed in the air-conditioning case 11 downstream of the air flow from the evaporator 13. The evaporator 13 may be a low-pressure side heat exchanger of a vapor compression refrigeration cycle, and may act as a cooling heat exchanger for cooling air passing therethrough. The heater 14 may derive heat from waste heat generated in a vehicle engine or the like, and may act as a heating heat exchanger for heating air passing therethrough.

The air-conditioning unit 10 may include a front-side bypass path 15 above the heater 14 and a rear-side bypass path 16 below the heater 14. Those two bypass paths 15 and 16 may act as an air passage bypassing the heater 14.

The air-conditioning unit 10 may also include a hot-air path 17 between the front-side bypass path 15 and the rear-side bypass path 16. The heater 14 may be disposed in the hot-air path 17. The hot-air path 17 may be separated into a front-side hot-air path 24 and a rear-side hot-air path 32 downstream of the heater 14 as described below.

The air-conditioning unit 10 may further include a front-side air-mixing door 18 disposed between the evaporator 13 and the heater 14. The front-side air-mixing door 18 may include a rotational shaft 19 and a plate member connected to the rotational shaft 19. The rotational shaft 19 may be disposed in the vicinity of the bottom portion of the front-side bypass path 15, that is, in the vicinity of the top portion of the heater 14, and both ends of the rotational shaft 19 may be rotatably supported by the air-conditioning case 11. The front-side air-mixing door 18 may be disposed to adjust an air-flow ratio between an air amount passing through the heater 14 and an air amount passing through the front-side bypass path 15. Accordingly, the air mixing door 18 controls an amount of air bypassing the heater 14 through the front-side bypass path 15 and controls the amount of air flowing through the heater 14.

The dimensions of the front-side air-mixing door 18 may exceed that of the front-side bypass path 15 and that of the hot-air path 17, and consequently, the front-side air-mixing door 18 may fully close the front-side bypass path 15 and the hot-air path 17.

Figure 2:
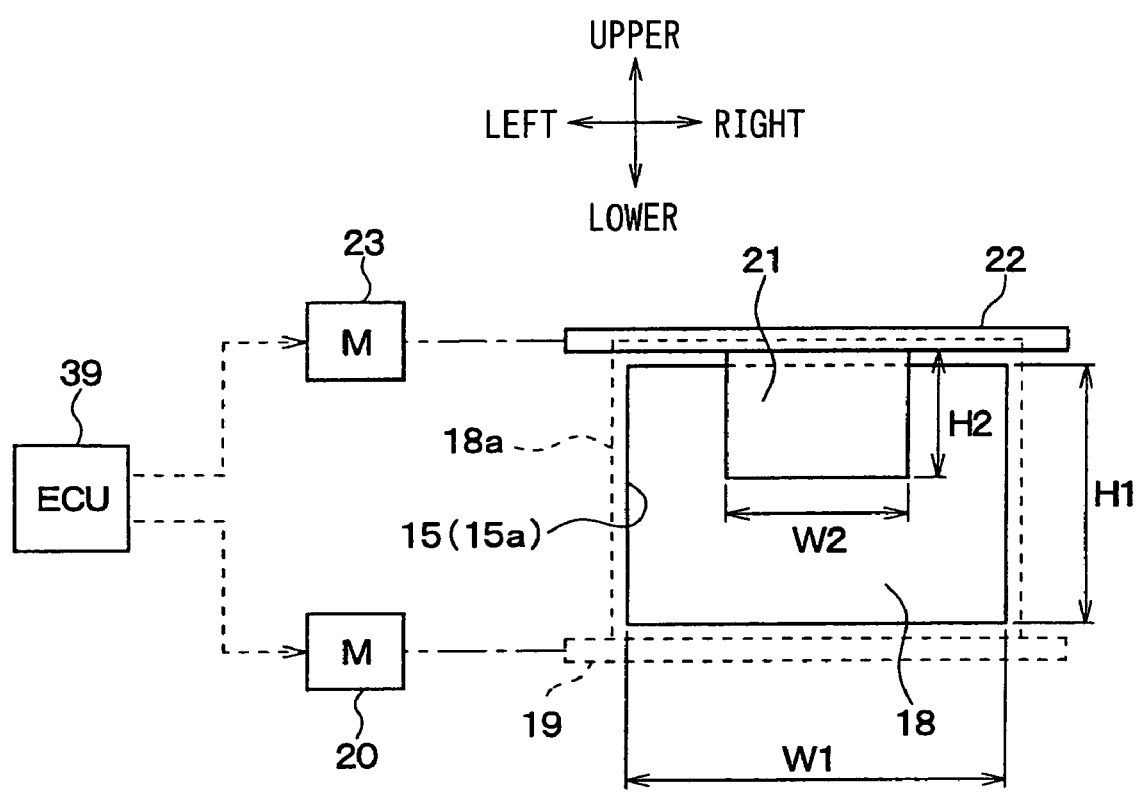
FIG. 2 illustrates a first embodiment of a part of the air-conditioning unit shown from the direction of an arrow A in FIG. 1.

As shown in FIG. 2, broken line 18a shows an outline of the front-side air-mixing door 18, while line 15a shows an outline of the air opening forming the bypass path 15. In other words, the dimensions of the front-side air-mixing door 18 exceed that of the air opening 15a. FIG. 2 further shows that one end of the rotational shaft 19 may be connected to a front-side air-mixing driving device 20 at the outside of the air-conditioning case 11. In this example embodiment, the front-side air-mixing driving device 20 may be an actuator device with a servomotor.

Returning to FIG. 1, an auxiliary door 21 may be arranged in series with the front-side air-mixing door 18 in the front-side bypass path 15. In this example embodiment, the auxiliary door 21 may be disposed downstream from the front-side air-mixing door 18. The auxiliary door 21 may include a rotational shaft 22 and a plate member connected to the rotational shaft 22, and both ends of the rotational shaft 22 may be rotatably supported by the air-conditioning case 11.

As shown in FIG. 2, dimensions of the auxiliary door 21 may be smaller than that of the front-side bypass path 15, and the auxiliary door 21 may overlap with only a part of the front-side bypass path 15.

FIG. 2 further shows that the air-conditioning case 11 may include an air opening 15a that may form a part of the front-side bypass path 15. The air opening 15a may have a rectangle shape with width W1 in a right and left direction and height H1 in an up and down direction. The rotational shaft 22 of the auxiliary door 21 may be disposed above the upper end of the air opening 15a. The longitudinal direction of the rotational shaft 22 may be parallel to that of the upper end of the air opening 15a.

Accordingly, the rotational shaft 22 of the auxiliary door 21 may be disposed at an opposite side of the front-side air-mixing door 18 from the rotational shaft 19 relative to the air opening 15a. That is, the auxiliary door 21 may be disposed at a distal end of the front-side air-mixing door 18 with respect to the rotational shaft 19.

The auxiliary door 21 may have a rectangle shape of width W2, which is smaller than width W1, in a right and left direction and may have a height H2, which is smaller than height H1, in an up and down direction. Also, the auxiliary door 21 may be disposed at the middle of the air opening 15a in a right and left direction.

One end of the rotational shaft 22 may be connected to an auxiliary door driving device 23 (shown in FIG. 2) outside of the air-conditioning case 11. In this example embodiment, the auxiliary door driving device 23 may be an actuator device with a servomotor.

As shown in FIG. 1, the front-side hot-air path 24, through which hot air warmed by the heater 14 may flow upward as shown by an arrow "a", may be disposed at an air downstream side (at a vehicle backward side) of the heater 14. Accordingly, cool air flowing through the front-side bypass path 15 as shown by an arrow "b" and hot air flowing through the front-side hot-air path 24 as shown by an arrow "a" may be mixed in a front-side air-mixing chamber 24' formed above the heater 14.

The air-conditioning case 11 may include plural front-side air openings 25-27 downstream (at a vehicle backward side) from the evaporator 13. Air from the front-side air-mixing chamber 24' may pass through the plural front-side air openings 25-27 and then be discharged toward a front side of a passenger compartment.

A defroster air opening 25 may be disposed in an upper wall of the air-conditioning case 11 and may be connected to a defroster air duct (not shown). The defroster air duct may include a defroster air outlet at one end thereof, and air discharged from the defroster air outlet may be blown toward an inner surface of a front windshield. A defroster door 28 may be disposed to open and close the defroster air opening 25.

A front-side face air opening 26 may be disposed in the upper wall of the air-conditioning case 11 closer to a back of the vehicle than the defroster air opening 25. The front-side face air opening 26 may be connected to a front-side face air duct (not shown). The front-side face air duct may include a front-side face air outlet at one end thereof, and air discharged from the front-side face air outlet may be blown toward an upper body of the front passenger(s). A front-side face door 29 may be disposed to open and close the front-side face air opening 26.

A front-side foot air opening 27 may be disposed at both the right and left side walls of the air conditioning case 11. Also, each of the front-side foot air openings 27 may be positioned above the heater 14. Each of the front-side foot air openings 27 may be connected to a respective front-side foot air duct (not shown). Each of the right and left front-side foot air ducts may include a front-side foot air outlet at one end thereof, and air discharged from the front-side foot air outlets may be blown toward the knees of the front passenger(s). A front-side foot door 30 may be associated with each front-side foot air opening 27 and disposed to open and close the respective front-side foot air opening 27.

The front-side foot air openings 27 and the front-side foot doors 30 may respectively each have a fan shape. Each of the front-side foot doors 30 may be connected to a rotational shaft 31. The rotational shaft 31 may be disposed to extend in the vehicle width direction, and both ends of the rotational shaft 31 may be rotatably supported in the air-conditioning case 11. The front-side foot doors 30 may be disposed in the air-conditioning case 11 so that door surfaces of the front-side foot doors 30 rotate in an axial direction of the rotational shaft 31 and may be moved along inner surfaces of the side walls of the air-conditioning case 11. When the front-side foot doors 30 fully close the front-side foot air openings 27, the front-side foot doors 30 may be at the position shown by the solid line in FIG. 1. When the front-side foot doors 30 fully open the front-side foot air openings 27, the front-side foot doors 30 may be at the position shown by the chain double-dashed line in FIG. 1.

The doors 28-30 may comprise a front-side air outlet mode switching door for switching a front-side air outlet mode. The doors 28-30 may be connected to a link mechanism (not shown) driven by a front-side air outlet mode driving device (not shown). The front-side air outlet mode driving device may be an actuator device with a servomotor.

Besides the front-side hot-air path 24, the hot-air path 17 may also be separated into a rear-side hot-air path 32 downstream from the heater 14. Hot air warmed by the heater 14 may flow downward as shown by an arrow "c", through the rear-side hot-air path 32. Also, a rear-side air-mixing door 33 may be disposed in the rear-side hot-air path 32.

The rear-side air-mixing door 33 may open and close the rear-side hot-air path 32 and the rear-side bypass path 16. The rear-side air-mixing door 33 may include a rotational shaft 34 and a plate member connected to the rotational shaft 34. The rotational shaft 34 may be disposed in the vicinity of the bottom portion of the heater 14, and both ends of the rotational shaft 34 may be rotatably supported by the air-conditioning case 11. One end of the rotational shaft 34 may be connected to a rear-side air-mixing driving device (not shown) at the outside of the air-conditioning case 11. In this example embodiment, the rear-side air-mixing driving device may be an actuator device with a servomotor.

Hot air flowing through the rear-side hot-air path 32 as shown by the arrow "c" and cool air flowing through the rear-side bypass path 16 as shown by an arrow "d" may be mixed in a rear-side air-mixing chamber 35 formed downstream from the heater 14.

A rear-side air outlet mode switching door 36, having an elbowed shape, may be disposed rotatable around a rotational shaft 36' in the rear-side air-mixing chamber 35. The rear-side air outlet mode switching door 36 may open and close a rear-side face air opening 37 and a rear-side foot air opening 38.

One end of the rotational shaft 36' of the rear-side air outlet mode switching door 36 may be connected to a rear-side air outlet mode driving device (not shown) at the outside of the air-conditioning case 11. In this example embodiment, the rear-side air outlet mode driving device may be an actuator device with a servomotor.

The rear-side face air opening 37 may be connected to a rear-side face air duct (not shown). The rear-side face air duct may include a rear-side face air outlet at one end thereof, and air discharged from the rear-side face air outlet may be blown toward an upper body of a rear passenger(s).

The rear-side foot air opening 38 may be connected to a rear-side foot air duct (not shown). The rear-side foot air duct may include a rear-side foot air outlet at one end thereof, and air discharged from the rear-side foot air outlet may be blown toward the knees of the rear passenger(s).

Returning to FIG. 2, the front-side air-mixing driving device 20, the auxiliary door driving device 23, the front-side air outlet mode driving device (not shown), the rear-side air-mixing driving device (not shown), and the rear-side air outlet mode driving device (not shown) may be controlled by an air-conditioning controlling device (ECU) 39 such as a well-known microcomputer. Accordingly, the ECU 39 controls the position and operation of the front-side air-mixing door 18, the auxiliary door 21, etc.

Next, operation of the air conditioner in this example embodiment will be explained.

When the air-conditioning controlling device 39 decides a front-side maximum heating mode, the controlling device (ECU) 39 controls the front-side air-mixing driving device 20 such that the front-side air-mixing door 18 is operated at the maximum heating position (100% opening degree) shown by solid line in FIG. 1.

In the front-side maximum heating mode, the front-side air-mixing door 18 may fully close the front-side bypass path 15 and may fully open the hot-air path 17. Accordingly, all air from the evaporator 13 may pass through the heater 14 and the front-side hot-air path 24, and then the air may flow toward the air openings 25-27. In winter, a foot mode, in which the front-side foot air opening 27 is open and both the defroster air opening 25 and the front-side face air opening 26 are closed, may be set and the hot air may pass through the front-side foot air opening 27.

The auxiliary door 21 may be operated at the fully closed position shown by the solid line in FIG. 1 in any mode but a front-side maximum cooling mode and a bi-level mode (both discussed below), and the auxiliary door 21 may be operated at the fully opened position shown by the chain double-dashed line in FIG. 1 in the front-side maximum cooling mode and in the bi-level mode. Therefore, the auxiliary door 21 may be operated at the fully closed position in the front-side maximum heating mode.

When the ECU 39 controls the front-side air-mixing door 18 to rotate counterclockwise slightly from the solid line position, that is, when the opening degree of the front-side air-mixing door 18 is slightly less than 100%, the front-side bypass path 15 may slightly open and cool air may begin to flow through this narrow path 15. Concurrently, the ECU 39 controls the auxiliary door 21 such that the auxiliary door may attain the fully closed position shown by the solid line in FIG. 1.

Accordingly, even when the front-side air-mixing door 18 may rotate counterclockwise slightly from the solid line position to create an initial opening of the bypass passage, since the auxiliary door 21 may partially cover the initial opening and the cool air passing through the narrow path 15, a sharp increase in the cool air flowing through the narrow path 15 may be reduced. Therefore, the temperature characteristic of the mixed air in the air-mixing chamber 24' with respect to the position or opening degree of the front-side air-mixing door 18 may become the solid line in FIG. 5, which approximates an ideal linear temperature characteristic shown by the broken line in FIG. 5.

Figure 5:
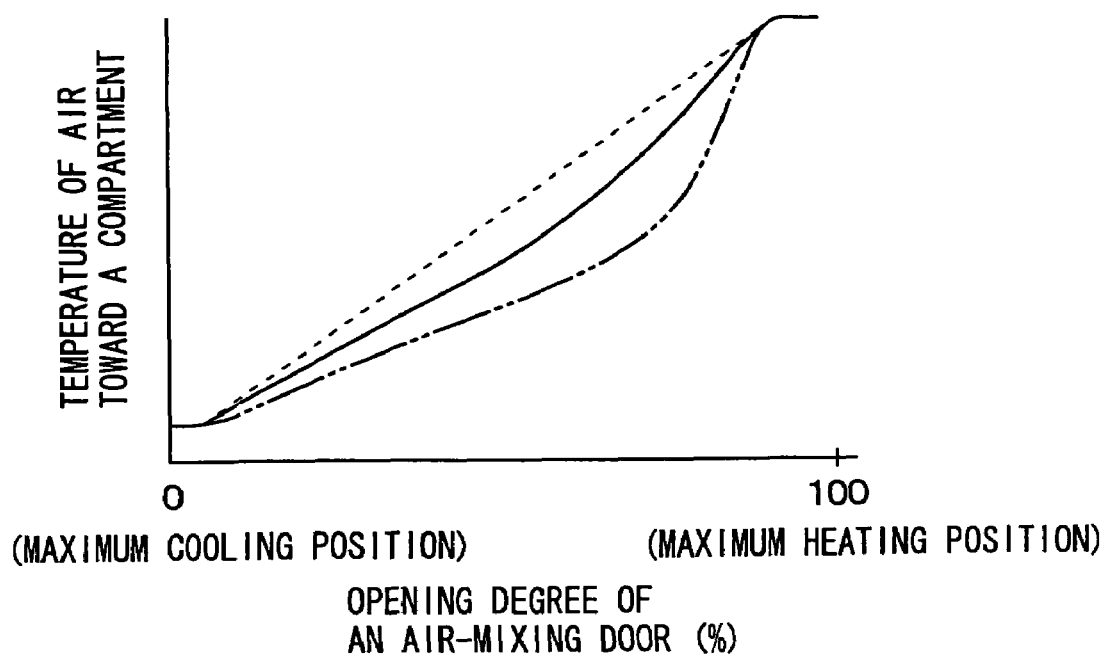
FIG. 5 illustrates a temperature characteristic of mixed air with respect to a position of an air-mixing door.

Particularly, since the auxiliary door 21 may be disposed where the front-side air-mixing door 18 begins to open the front-side bypass path 15, a sharp decrease in the temperature of the mixed air, shown by the chain double-dashed line in FIG. 5, can be effectively prevented even if the area of the auxiliary door 21 is small.

On the other hand, when the ECU 39 decides the front-side maximum cooling mode, the ECU 39 controls the front-side air-mixing driving device 20 such that the front-side air-mixing door 18 may be operated at the maximum cooling position (0% opening degree) shown by chain double-dashed line in FIG. 1. Also, in the front-side maximum cooling mode, the ECU 39 may control the auxiliary door driving device 23 such that the auxiliary door 21 may be operated at the fully opened position shown by the chain double-dashed line in FIG. 1.

In the front-side maximum cooling mode, the ECU 39 may control the front-side air-mixing door 18 to fully open the front-side bypass path 15, and the ECU 39 may also control the auxiliary door 21 to fully open the front-side bypass path 15. Further, the front-side air-mixing door 18 may be controlled to fully close the hot-air path 17. Accordingly, all air from the evaporator 13 may pass through the front-side bypass path 15 and then may flow toward the air openings 25-27. In summer, a face mode, in which the front-side face air opening 26 is open and both the defroster air opening 25 and the front-side foot air opening 27 are closed, may be set and the cool air may pass through the front-side face air opening 26.

In the front-side maximum cooling mode, since both the front-side air-mixing door 18 and the auxiliary door 21 may fully open the front-side bypass path 15, the area of the cool air may be maximized, and the amount of the cool air may be maximized.

Because the rotational shaft 22 of the auxiliary door 21 may be disposed outside of the air opening 15*a*, problems caused by existence of the shaft 22 may be reduced.

Further, since the front-side bypass path 15 may be sealed by the front-side air-mixing door 18, a seal member for sealing the front-side bypass path 15 may be eliminated from the auxiliary door 21.

When the front-side air-mixing door 18 rotates clockwise from the chain double-dashed line position, that is, when the opening degree of the front-side air-mixing door 18 is more than 0%, the hot-air path 17 may slightly open and cool air cooled by the evaporator 13 may begin to flow through the heater 14. Also, the auxiliary door 21 may be operated at the fully closed position shown by solid line in FIG. 1.

In this example embodiment, since the auxiliary door 21 may be operated at the fully closed position when the opening degree of the front-side air-mixing door 18 is more than 0%, cool air passing through the front-side bypass path 15 may be directed toward the front-side hot-air path 24. Therefore, the cool air and the hot air may be mixed sufficiently.

In spring and/or autumn, a bi-level mode, in which both the front-side face air opening 26 and the front-side foot air opening 27 are open and the defroster air opening 25 is closed, may be set. In the bi-level mode, the temperature of air discharged from the front-side face air opening 26 may be lower than that of air discharged from the front-side foot air opening 27 as is well-known.

In this example embodiment, the bi-level mode may include a first bi-level mode and a second bi-level mode. Regarding the temperature difference between the air discharged from the front-side face air opening 26 and the air discharged from the front-side foot opening 27, the temperature difference in the first bi-level mode may be more than that in the second bi-level mode.

When the air-conditioning controlling device 39 decides the first bi-level mode and then controls the auxiliary door driving device 23, the auxiliary door 21 may be operated at the fully opened position shown by the chain double-dashed line in FIG. 1.

On the other hand, when the air-conditioning controlling device 39 decides the second bi-level mode and then controls the auxiliary door driving device 23, the auxiliary door 21 may be operated at the fully closed position shown by the solid line in FIG. 1.

The air-conditioning controlling device 39 may also control the rear-side air-mixing door 33 and the rear-side air outlet mode switching door 36.

According to the example embodiment described above, the air-conditioning unit 10 may be formed to control temperature of the right-side of the vehicle air and the left-side of the vehicle air equally. However, the air-conditioning unit 10 may be formed to control temperature of the right-side of the vehicle air and the left-side of the vehicle air independently.

Figure 3:
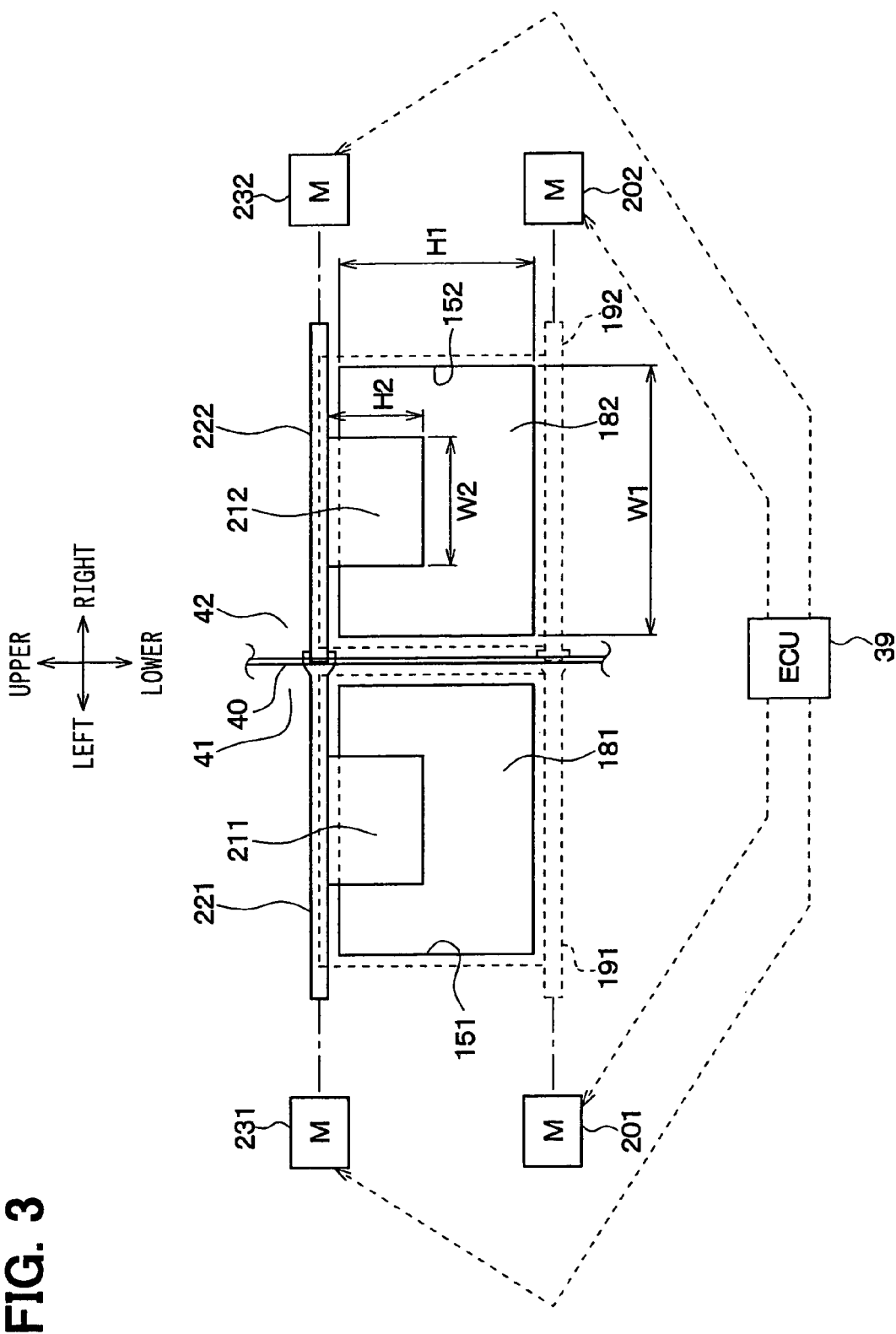
FIG. 3 illustrates a second embodiment of the part of the air-conditioning unit shown from the direction of an arrow A in FIG. 1.

In this example embodiment shown in FIG. 3, a partition wall 40 may be disposed downstream from the evaporator 13 in a central portion of the air-conditioning case 11. The partition wall 40 may partition an air path in the air-conditioning case 11 into a left air path 41 and a right air path 42 in such a manner that air passing through the left path 41 may be discharged toward a left-side of the vehicle passenger compartment, and air passing through the right path 42 may be discharged toward a right-side of the vehicle passenger compartment.

The partition wall 40 may also partition the front-side bypass path 15 into a left front-side bypass path 151 and a right front-side bypass path 152.

In this example embodiment, the front-side air-mixing door 18 may be separated into a left front-side air-mixing door 181 and a right front-side air-mixing door 182, and the auxiliary door 21 may be separated into a left auxiliary door 211 and a right auxiliary door 212.

One end of a rotational shaft 191 of the left front-side air-mixing door 181 may be connected to a left front-side air-mixing driving device 201 at the outside of the air-conditioning case 11. One end of a rotational shaft 192 of the right front-side air-mixing door 182 may be connected to a right front-side air-mixing driving device 202 at the outside of the air-conditioning case 11. One end of a rotational shaft 221 of the left auxiliary door 211 may be connected to a left auxiliary door driving device 231 at the outside of the air-conditioning case 11. One end of a rotational shaft 222 of the right auxiliary door 212 may be connected to a right auxiliary door driving device 232 at the outside of the air-conditioning case 11. The physical relationship between the bypass path 151, the left front-side air-mixing door 181 and the left auxiliary door 211 and the physical relationship between the bypass path 152, the right front-side air-mixing door 182 and the right auxiliary door 212 may be the same as described with respect to the bypass path 15, the air-mixing door 18 and the auxiliary door 21 shown in FIG. 1.

In this example embodiment, the air-conditioning controlling device 39 may control each one of the driving devices 201, 202, 231 and 232 independently, so as to control temperature of the right-side air and the left-side air independently.

According to the example embodiments described above, the front-side air-mixing doors 18, 181 and 182 may be composed of the rotational shaft and the plate member. However, the front-side air-mixing doors 18, 181 and/or 182 may be composed of a film door.

Figure 4:
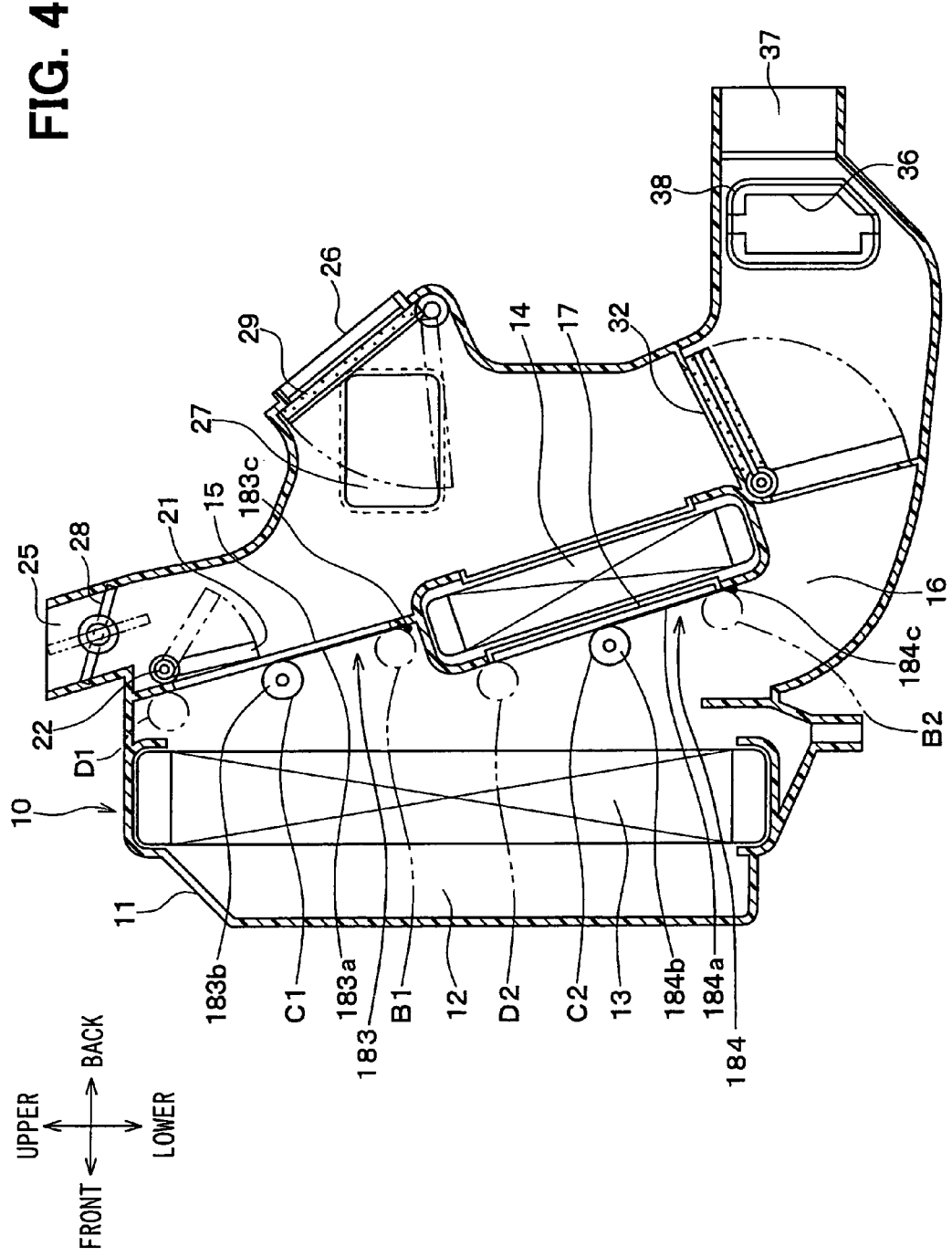
FIG. 4 illustrates a cross section of an air-conditioning unit according to an another example embodiment of the present invention.

This example embodiment is shown in FIG. 4 where like reference numerals represent like elements, and a description thereof will be omitted for the sake of brevity. As shown, the front-side air-mixing door may be composed of a front-cool-side air-mixing door 183 and a front-hot-side air-mixing door 184.

The front-cool-side air-mixing door 183 may include a cool-side film member 183*a* and a cool-side rotational shaft 183*b*. The cool-side film member 183*a* may be formed from a flexible resin film. One end of the cool-side film member 183*a* may be connected to the cool-side rotational shaft 183*b*, and the other side of the cool-side film member 183*a* may be connected to a portion 183*c* of the air-conditioning case 11.

The front-hot-side air-mixing door 184 may include a hot-side film member 184*a* and a hot-side rotational shaft 184*b*. The hot-side film member 184*a* may be formed from a flexible resin film. One end of the hot-side film member 184*a* may be connected to the hot-side rotational shaft 184*b*, and the other side of the hot-side film member 184*a* may be connected to a portion 184*c* of the air-conditioning case 11.

The cool-side rotational shaft 183*b* may be disposed to move up and down so as to cross the front-side bypass path 15. When the cool-side rotational shaft 183*b* rotates counterclockwise, the cool-side rotational shaft 183*b* moves downward and rolls the cool-side film member 183*a*, and when the cool-side rotational shaft 183*b* rotates clockwise, the cool-side rotational shaft 183*b* moves upward and unrolls the cool-side film member 183*a*.

The hot-side rotational shaft 184*b* may also be disposed to move up and down so as to cross the hot-air path 17. When the hot-side rotational shaft 184*b* rotates counterclockwise, the hot-side rotational shaft 184*b* moves downward and rolls the hot-side film member 184*a*. When the hot-side rotational shaft 184*b* rotates clockwise, the hot-side rotational shaft 184*b* moves upward and unrolls the hot-side film member 184*a*.

In this example embodiment, the cool-side rotational shaft 183*b* may be driven by a driving device (not shown) disposed outside the air-conditioning case 11, and the hot-side rotational shaft 184*b* may be driven by another driving device (not shown) disposed outside the air-conditioning case 11. These two driving devices are controlled by the ECU 39.

Therefore, when the cool-side film member 183*a* is completely rolled up by the cool-side rotational shaft 183*b* (shown by chain double-dashed line B1 in FIG. 4) and the hot-side film member 184*a* is completely unrolled by the hot-side rotational shaft 184*b* (shown by chain double-dashed line D2 in FIG. 4), a maximum cooling mode (0% opening degree of air-mixing door) may be set.

On the other hand, when the cool-side film member 183*a* is completely unrolled by the cool-side rotational shaft 183*b* (shown by chain double-dashed line D1 in FIG. 4) and the hot-side film member 184*a* is completely rolled up by the hot-side rotational shaft 184*b* (shown by chain double-dashed line B2 in FIG. 4), a maximum heating mode (100% opening degree of air-mixing door) may be set.

Further, when the cool-side rotational shaft 183*b* is at the position shown by chain double-dashed line C1 in FIG. 4 and the hot-side rotational shaft 184*b* is at the position shown by chain double-dashed line C2 in FIG. 4, the opening degree of the air-mixing door may be 50%.

In this example embodiment, the auxiliary door 21 may be disposed downstream from the front-side air-mixing door in the front-side bypass path 15. Also, the auxiliary door 21 may be disposed where the front-cool-side air-mixing door 183 begins to open.

According to the example embodiment shown in FIG. 4, the front-side air-mixing door may be composed of plural film doors 183 and 184. However, the front-side air-mixing door may be composed of single film door as known by JP 7-89332 for example.

In an example embodiment, the auxiliary door 21 may be composed of a film door as described above with respect to the air-mixing door 18.

In an example embodiment, the auxiliary door 21 may be composed of a sliding door which may include a plate member sliding to cross the front-side bypass path 15.

In an example embodiment, the auxiliary door 21 may be disposed upstream from the front-side air-mixing doors 18, 181 and/or 182.

In the example embodiments described above, the auxiliary door 21 may be operated at the fully closed position in any mode but the front-side maximum cooling mode and the bi-level mode. However, the auxiliary door 21 may be fully or partly closed at least when the front-side air-mixing door 18, 181 and/or 182 slightly opens from the maximum heating position.

Such variations are not to be regarded as departure from the spirit and scope of the example embodiments of the present invention, and all such modifications as would be obvious to one skilled in the art are intended to be included within the scope of the following claims.

What is claimed is:

1. An air-conditioning unit comprising:
   an air-conditioning case forming an air path therein;
   a heater for heating air passing therethrough, the heater being disposed in the air-conditioning case;
   a bypass path bypassing the heater;
   an air-mixing chamber in which cool air flowing through the bypass path and hot air passed through the heater are mixed;
   an air-mixing door disposed in the air-conditioning case to adjust an air-flow ratio between an air amount passing through the heater and an air amount passing through the bypass path;
   at least one air opening disposed in the air-conditioning case at an air downstream side of the air-mixing chamber;
   an auxiliary door arranged in series with the air-mixing door in the bypass path;
   the auxiliary door being operated between a first position and a second position, the auxiliary door in the first position closing the bypass path more than in the second position;
   the air-mixing door is operated between a maximum cooling position in which the air-mixing door fully opens the bypass path and fully closes the heater, and a maximum heating position in which the air-mixing door fully closes the bypass path and fully opens the heater;
   the auxiliary door is operated at the first position as the air-mixing door opens the bypass oath from the maximum heating position;
   the auxiliary door is operated at the first position when the air-mixing door is operated at the maximum heating position;
   the auxiliary door is operated at the second position when the air-mixing door is operated at the maximum cooling position;
   dimensions of the auxiliary door are smaller than dimensions of the bypass path;
   the auxiliary door overlaps with only a part of the bypass path; and
   the auxiliary door is disposed in the air-conditioning case where the air-mixing door begins to open the bypass path.

2. The air-conditioning unit according to claim 1, wherein:
   the auxiliary door includes a rotational shaft and a plate member connected to the rotational shaft; and
   the rotational shaft is disposed outside of the bypass path.

3. The air-conditioning unit according to claim 1, wherein:
   the air-mixing door includes a rotational shaft and a plate member connected to the rotational shaft; and
   the auxiliary door is disposed at an opposite position of the shaft relative to the bypass path.

4. The air-conditioning unit according to claim 1, wherein the auxiliary door is disposed downstream of the air-mixing door with respect to the cool air.

5. An air-conditioning unit for a vehicle, comprising:
   an air-conditioning unit of claim 1; and the air-conditioning unit being disposed in a passenger compartment of the vehicle.

6. The air-conditioning unit for a vehicle according to claim 5, wherein
the air opening includes a face air opening through which air is blown toward an upper body of a passenger in the compartment and a foot air opening through which air is blown toward a knee of the passenger in the compartment;
the air-conditioning unit includes an air outlet mode switching member for opening and closing the face air opening and the foot air opening; and
the auxiliary door is operated at the first position when a bi-level mode, in which the air outlet mode switching member opens both the face air opening and the foot air opening, is set.

7. The air-conditioning unit for a vehicle according to claim 5, wherein
the air opening includes a face air opening through which air is blown toward an upper body of a passenger in the compartment and a foot air opening through which air is blown toward a knee of the passenger in the compartment;
the air-conditioning unit includes an air outlet mode switching member for opening and closing the face air opening and the foot air opening; and
the auxiliary door is operated at the second position when a bi-level mode, in which the air outlet mode switching member opens both the face air opening and the foot air opening, is set.

8. The air-conditioning unit for a vehicle according to claim 5, wherein
the air opening includes a face air opening through which air is blown toward an upper body of a passenger in the compartment and a foot air opening through which air is blown toward a knee of the passenger in the compartment;
the air-conditioning unit includes an air outlet mode switching member for opening and closing the face air opening and the foot air opening;
the air outlet mode switching member is disposed to set a bi-level mode in which the air outlet mode switching member opens both the face air opening and the foot air opening;
the bi-level mode includes a first bi-level mode and a second bi-level mode;
a temperature difference between air discharged from the face air opening and air discharged from the foot opening in the second bi-level mode is more than that in the first bi-level mode;
the auxiliary door is operated at the first position when the first bi-level mode is set; and
the auxiliary door is operated at the second position when the second bi-level mode is set.

9. The unit of claim 1, wherein the air-mixing door includes a first rotational shaft and a terminal edge disposed opposite to the first rotational shaft, the auxiliary door includes a second rotational shaft and the second rotational shaft is disposed adjacent the terminal edge of the air-mixing door when the air-mixing door closes the bypass passage.

10. The unit of claim 1, wherein the auxiliary door partially covers an initial opening of the bypass path when the air mixing-door begins to open the bypass path.

11. An air-conditioning unit, comprising:
an air-mixing control device controlling an amount of air bypassing a heater through a bypass passage; and
an air-resistance device selectively providing resistance to the controlled amount of the air bypassing the heater through the bypass passage; wherein
the air-mixing control device includes a first rotatable plate and the air-resistance device includes a second rotatable plate, and an area of the second rotatable plate is less than an area of the first rotatable plate;
the bypass passage is a generally rectangular passage having a height and a width;
the second rotatable plate is a generally rectangular plate having a height analogous to the height of the bypass passage and a width analogous to the width of the bypass passage;
the height of the second rotatable plate being substantially less than the height of the bypass passage; and
the width of the second rotatable plate being substantially less than the width of the bypass passage.

12. The unit of claim 11, wherein
the air-mixing control device includes one of a rotatable plate and a movable film.

13. The unit of claim 11, wherein the air-resistance device includes one of a rotatable plate and a moveable film.

14. The unit of claim 11, wherein the air-resistance device is disposed downstream with respect to a flow of the controlled amount of air from the air-mixing control device.

15. The unit of claim 11, wherein
the controlled amount of air is partitioned into a first amount and a second amount; and
the air-resistance device includes a first resistance member selectively providing resistance to the first amount and a second resistance member selectively providing resistance to the second amount.

16. The unit of claim 15, wherein the first and second resistance members are independently controllable.

17. The unit of claim 11, further comprising:
a controller controlling the air-mixing control device and the air-resistance device.

18. The unit of claim 17, further comprising:
a chamber in which air flowing through the heater and the controlled amount of air mix; and
the controller controls the air resistance device to reduce a change in temperature of the mixed air as the air-mixing control device permits air to bypass the heater.

19. The unit of claim 17, wherein the controller controls the air-resistance device to increase resistance to the controlled amount of air as the air-mixing control device increases an amount of the controlled amount of air.

20. The unit of claim 17, further comprising:
a chamber in which air flowing through the heater and the controlled amount of air mix; and
the controller controls the air-mixing control device and the air-resistance device to provide a linear change in temperature of the mixed air as the air-mixing control device permits air to bypass the heater.

21. The unit of claim 20, wherein the controller controls the air-resistance device to increase resistance to the controlled amount of air as the air-mixing control device increases an amount of the controlled amount of air.

22. The unit of claim 11, wherein the first rotatable plate includes a first rotational shaft and a terminal edge disposed opposite to the first rotational shaft, the second rotatable plate includes a second rotational shaft and the second rotational shaft is disposed adjacent the terminal edge of the first rotatable plate when the first rotatable plate closes the bypass passage.

23. An air-conditioning unit comprising:
an air-conditioning case forming an air path therein;

a heater for heating air passing therethrough, the heater being disposed in the air-conditioning case;

a bypass path bypassing the heater;

an air-mixing chamber in which cool air flowing through the bypass path and hot air passed through the heater are mixed;

an air-mixing door disposed in the air-conditioning case to adjust an air-flow ratio between an air amount passing through the heater and an air amount passing through the bypass path;

at least one air opening disposed in the air-conditioning case at an air downstream side of the air-mixing chamber;

an auxiliary door arranged in series with the air-mixing door in the bypass path;

the auxiliary door being operated between a first position and a second position, the auxiliary door in the first position closing the bypass path more than in the second position, the auxiliary door not prohibiting air flow between the heater to the at least one air opening in both the first and second position of the auxiliary door; and the auxiliary door being operated at the first position at least as the air-mixing door opens the bypass path.

* * * * *